(No Model.)
J. MYERS & T. B. SIMONTON.
MACHINE FOR WELDING PLOWSHARES AND LAND SIDES.
No. 260,221. Patented June 27, 1882.
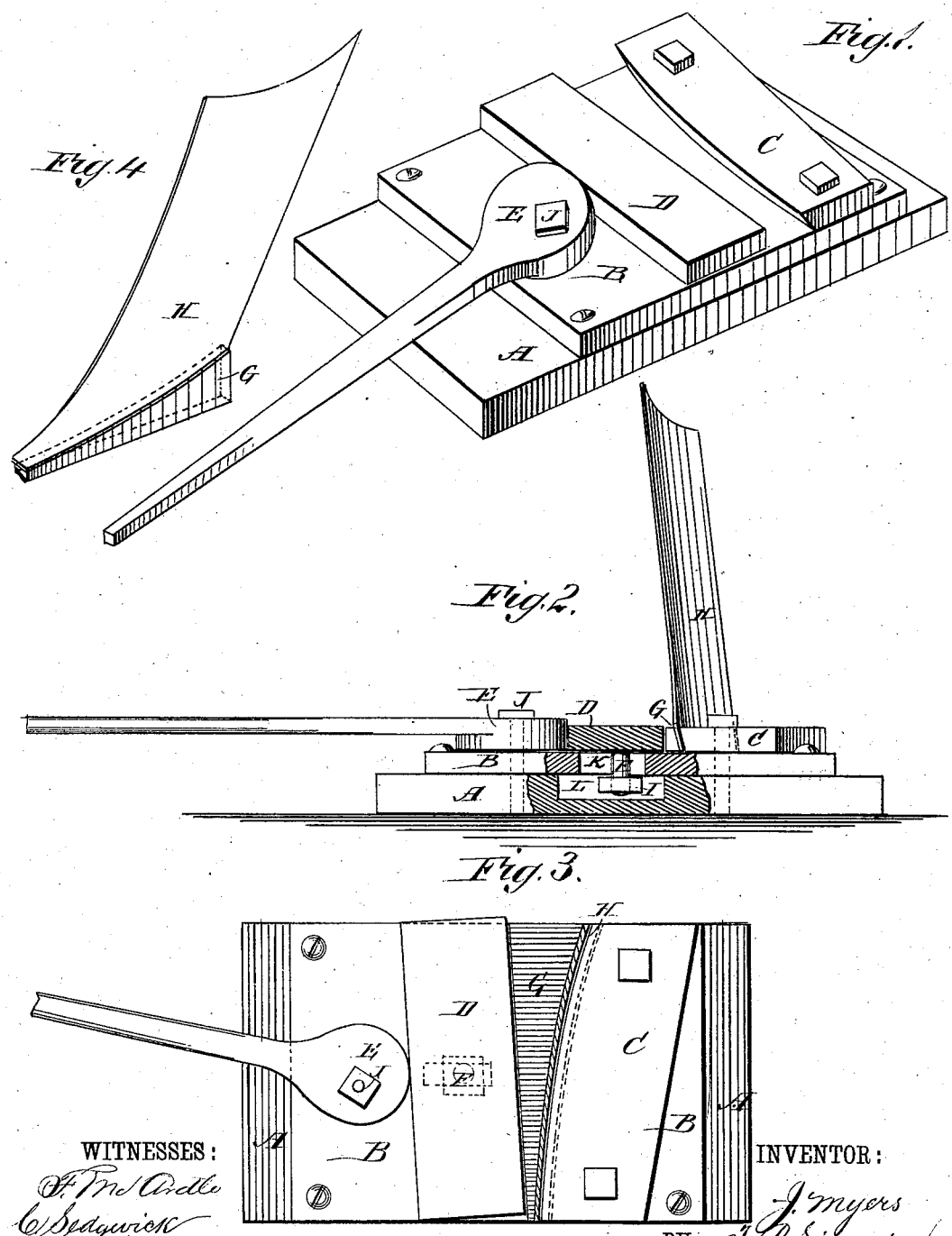

UNITED STATES PATENT OFFICE.

JOSEPH MYERS AND THOMAS B. SIMONTON, OF SUPERIOR, NEBRASKA.

MACHINE FOR WELDING PLOWSHARES AND LANDSIDES.

SPECIFICATION forming part of Letters Patent No. 260,221, dated June 27, 1882.

Application filed March 23, 1882. (No model.)

*To all whom it may concern:*

Be it known that we, JOSEPH MYERS and THOMAS B. SIMONTON, of Superior, Nuckolls county, Nebraska, have invented a new and Improved Machine for Welding Plowshares and Landsides Together, of which the following is a full, clear, and exact description.

This invention consists of a pair of squeezing and welding jaws and a bed-plate and operating-lever constructed and arranged suitably for welding a plowshare and landside together, one of said jaws being stationary on the bed and the other movable thereon, to clamp the share and landside together when previously temporarily connected and properly heated, the said stationary jaw being longitudinally curved and transversely beveled in conformity with the shape of the share, and the movable jaw being straight and square with the bed on its face in conformity with the side of the landside upon which it acts, all being contrived and arranged to successfully weld the two devices together more quickly, cheaper, and much better than they can be by hand, as hereinafter more fully described.

Reference is to be had to the accompanying drawings, forming part of this specification, in which similar letters of reference indicate corresponding parts in all the figures.

Figure 1 is a perspective view of our improved welding-machine. Fig. 2 is a side elevation, with a part shown in section and with the share and landside in position. Fig. 3 is a plan view of the machine, also with a share and landside in position; and Fig. 4 is a perspective view of a plowshare and landside welded together.

A represents a base-plate, on which another plate, B, is fastened, and on this plate B the stationary jaw C, movable jaw D, and the working-lever E are mounted. These jaws consist of flat plates or bars of steel or iron about as long as or a little longer than the landside G and the share H, Figs. 1, 3, and 4, and also being of suitable thickness relative to the landside. Jaw C has a convex curvature from end to end of its operative face, and is also beveled transversely, the inclination being such that the top edge overhangs the under one in reverse of the form of the share, the side of which to be acted upon by said jaw being concave from end to end and sloping from the bottom upward. Jaw D has a straight and vertical face, which is the form of the side of the landside on which it acts. This jaw, being movable toward and from stationary jaw C, is also so mounted that it can vibrate on a single confining-bolt, F, which extends through a slot, K, in plate B into a recess, L, in plate A, where it is secured by a nut, I.

The lever E for working jaw D has an eccentric head, which presses said jaw up with great force when turned on its pivot J. Any other form of lever device—for instance, toggle-joint levers, or others, or a screw, or other means of working the movable jaw—may be employed with like results.

The landside, being first forged into suitable shape, with one straight and square edge and the other tapered, concaved, and beveled to match the convex side of the share, is temporarily welded thereto at the point or elsewhere to unite them with sufficient connection to prevent displacement while heating them for the permanent weld. The two are then heated together, and then placed in the machine between the jaws C D. They are then quickly forced together by the lever, and so held for a short time, and thus perform the work with dispatch, doing it much better than it can be done by hand, the weld being in this case uniform throughout, while in the hand process the weld is always more or less imperfect, being good directly under or within the places receiving the blows of the hammer and slack where not struck.

It will be observed that the pivotal arrangement of the movable jaw is essential to the successful action of the machine, as it enables the work to be clamped with like pressure from end to end, the jaw assuming at once the line of the landside and bearing alike upon it from end to end.

The plate A will be understood to represent a bench-top, block, or other suitable support for the base-plate proper, B, which carries the operative parts of the machine.

Having thus described our invention, we claim as new and desire to secure by Letters Patent—

1. The combination of stationary jaw C, having convex longitudinal and beveled transverse face with overhanging upper edge, and the movable jaw D, having straight and vertical face, and also with a locking-lever, E, substantially as specified.

2. A pair of welding-jaws, C and D, constructed and arranged for welding plowshares and landsides, as described, one of which jaws is permanently attached to a bed-plate and the other movable thereon, and being secured to the base by a sliding pivotal bolt, F, substantially as specified.

3. The convex and bevel-faced stationary jaw C, straight and square-faced movable jaw D, and working-lever E, in combination, said jaws being located and arranged relatively on the bed-plate B to clamp the tapered landside and mold-board, having one straight side and one longitudinally-concave and transversely-beveled side, substantially as specified.

JOSEPH MYERS.
THOMAS B. SIMONTON.

Witnesses:
J. A. TRANSUE,
JACOB SHAFER.